3,453,867
DETECTION OF FUEL ELEMENT SHEATHING FAILURES IN NUCLEAR REACTORS
John Webb, Bryn, Wigan, John Andrew Gatley, Appleton, and Albert McFall, Liverpool, England, assignors to United Kingdom Atomic Energy Authority, London, England
Filed Aug. 18, 1965, Ser. No. 480,687
Claims priority, application Great Britain, Aug. 21, 1964, 34,387/64
Int. Cl. G21c 17/02
U.S. Cl. 73—19                    3 Claims

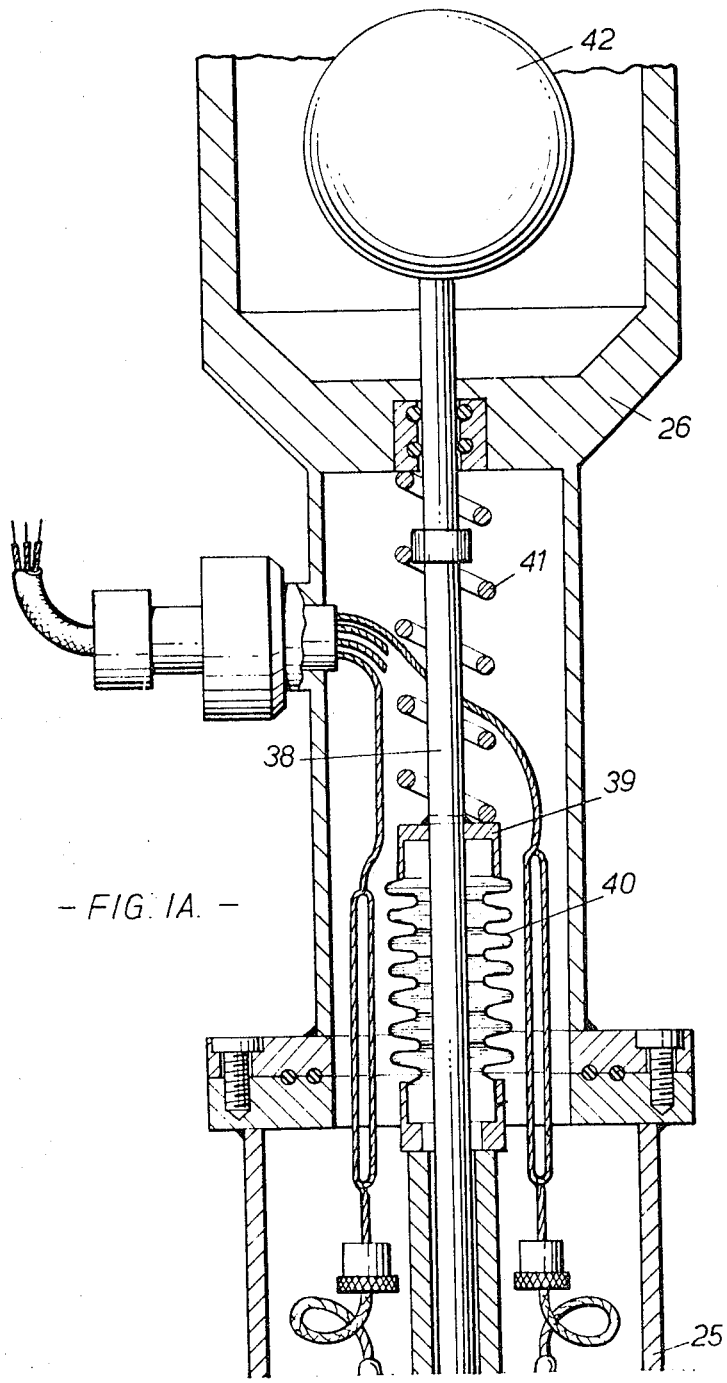
- FIG. IA. -

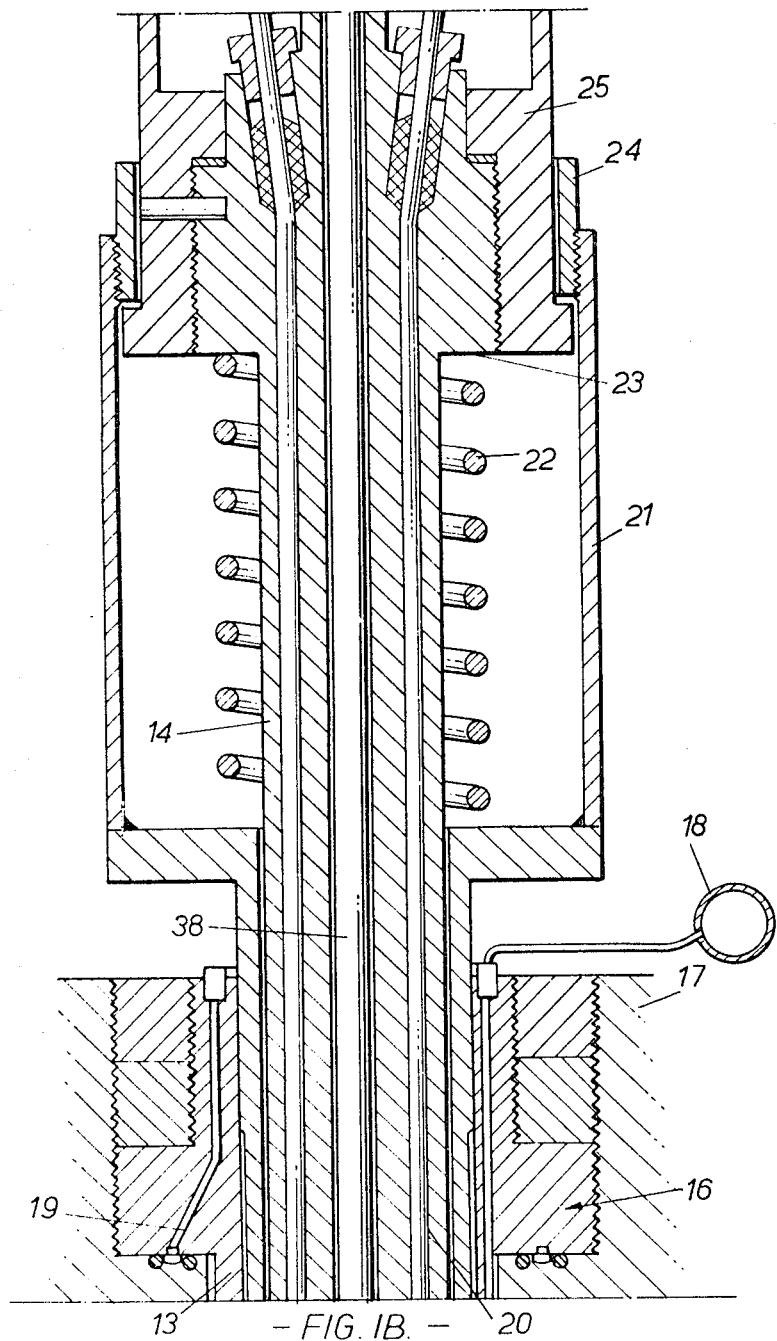
- FIG. 1B. -

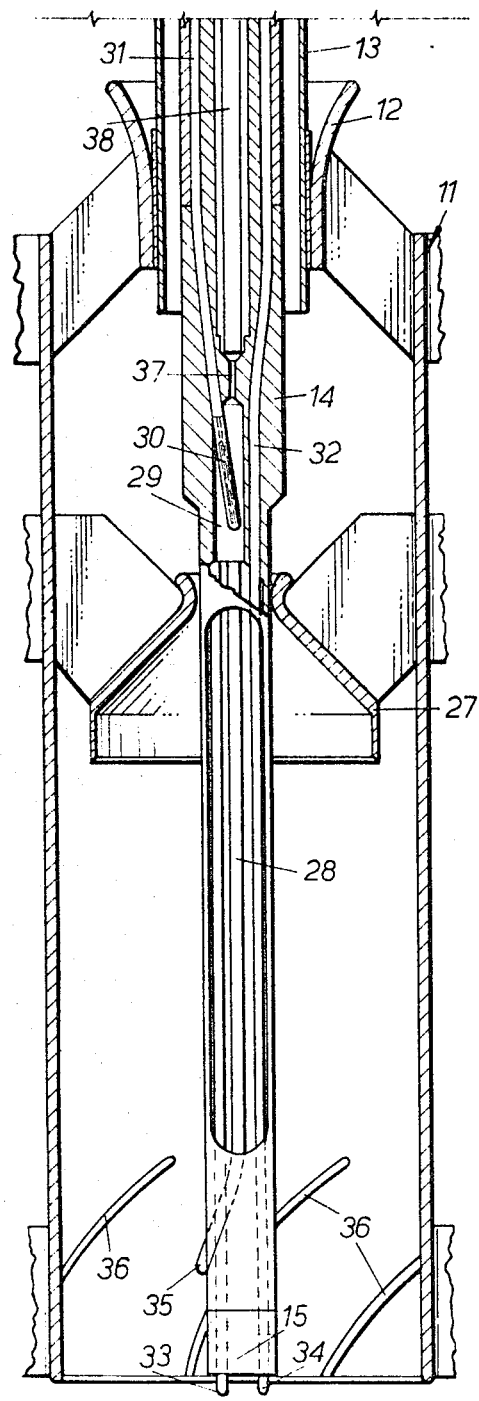
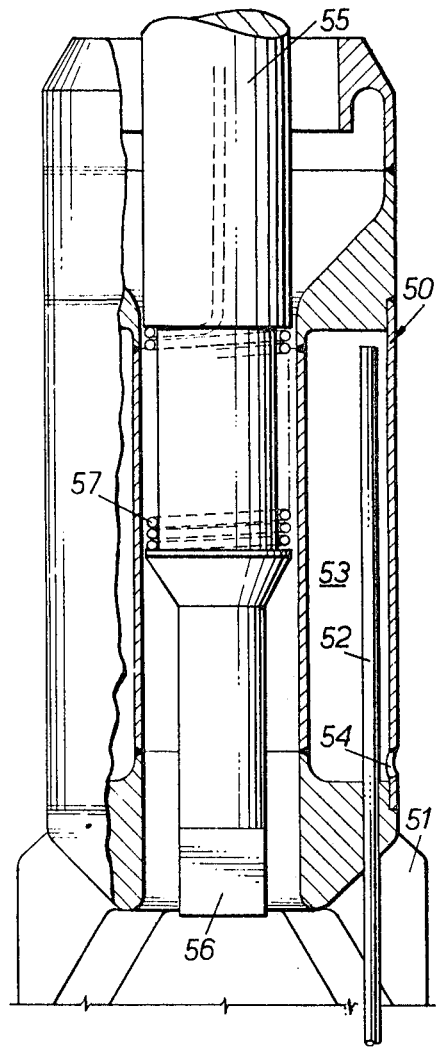
—FIG. 2.—
—FIG. 1C.—

ABSTRACT OF THE DISCLOSURE

Apparatus for testing for fuel element sheathing failures in a liquid metal cooled fast nuclear reactor in which the core is immersed in a pool of the liquid metal coolant, comprises means for localising within a collector zone any gaseous substance derived from the fuel elements, and means for sensing whether said gaseous substance or coolant is mainly present in the collector zone, whereby a sheathing failure can be detected by interpreting the sensing means. The collector zone and sensing means are situated within the liquid metal coolant, which makes sampling pipes unnecessary.

---

The present invention relates to apparatus for testing for the occurrence of fuel element sheathing failures in nuclear reactors.

Existing testing methods most extensively applied depend on sampling the reactor coolant and the detection in the samples of phenomena, such as delayed neutron emission or precipitation of radioactive solid daughter products, which in the circumstances of the particular test can be presumed to indicate the presence of fission products. In order to give some indication of whereabouts in the core the fission products are escaping, samples have to be taken from different parts of the core and the more nearly one requires the origin of a failure signal to be traceable to an individual fuel element in the core the greater becomes the number of different samples which have to be taken; sampling pipes are needed for taking the different samples and therefore huge quantities of piping can become necessary for conducting the samples to the detection instruments.

Apparatus in accordance with the invention may comprise a collector in the form of a bell, that is to say, a receptacle with a bottom-opening, and preferably flared, mouth, which is disposed to be submerged in the liquid phase coolant where such bubbles will collect therein, there being associated with the collector an instrument to monitor liquid displacement in the collector. The collection of released gas is carried out in the neighborhood of the fuel elements themselves so that the need for sampling pipes is eliminated.

Methods of testing for sheathing failures are generally considered in the context of sealed fuel sheaths whose function it is to prevent fission products escaping into the coolant. However, even with so-called vented fuel in which the gases liberated by the fuel are allowed by design to escape into the surroundings, testing methods according to the invention still have a useful part to play because breaches of the sheathing might allow the ejection of fissile material into the coolant or the escape of fission product components which otherwise would not be vented because of decay to a solid form in the vent path. Thus for a reactor cooled by liquid phase coolant, a fuel element having a vent path is provided in accordance with the invention with a detector to indicate whether coolant is present in the vent path. In the event of a serious failure occurring in the sheathing, it is to be expected that liquid coolant will enter and eventually flood the vent path; hence the indication that coolant is present can serve as an indication of such failure.

By way of example the invention will be further described with reference to the particular embodiments which are illustrated in the accompanying drawings in which:

FIGURES 1A and 1B show in longitudinal section a top portion of an instrumentation column as installed in a fast nuclear reactor cooled by sodium coolant, this portion extending vertically above the top shield by which a reactor vessel containing the reactor core is closed, FIGURE 1C shows, also in longitudinal section, a lower portion of the same column, this portion being dependent below the top shield, FIGURE 2 is a part longitudinal section of an arrangement constituting the second embodiment.

In the embodiment of FIGURES 1A, 1B and 1C, it is to be understood that there is an instrumentation column for each of the fuel element assemblies (not shown) which contain sealed sheath fuel elements and are juxtaposed to form the reactor core. Situated as a fixture in the reactor vessel just above the top ends of the assemblies is a cage structure 11 (FIGURE 1C) which locates the lower ends of the columns, such location being derived from a socket 12 of the cage structure into which fits an outer sleeve 13 of the column. This outer sleeve extends through the top shield where the wall thickness of the sleeve is greater than appears in FIGURE 1B to provide a guide for a coaxial gag-operating spindle 14 which projects beyond the lower open end of the sleeve to a point on a level with the underside of the cage structure. A square end 15 is formed on this spindle for operation of a gag valve in the manner now to be briefly described.

Referring to FIGURES 1A and 1B, it will be seen that the upper end of the outer sleeve 13, terminates in a sealing arrangement 16 at the upper face of the top shield 17, this arrangement being fed with purge gas from a pipe 18 through passages such as 19, and that between the sleeve and the upper continuation of the spindle 14 there is interposed a tubular stem 20 of a cylindrical spring housing 21. A coil spring 22 acts between the base of this housing and a spring seating flange 23 formed on the spindle so as to urge the spindle in a direction away from the associated fuel element assembly to bring into engagement with a stop ring 24 in the housing a flange of a casing 25 fixed to the spindle. Above this casing is a spindle operating head 26. Against the action of the spring 22 the operating head can be depressed to cause the square end 15 of the spindle to enter the top of the associated fuel element assembly and engage in a socket of a gag valve which is included in the assembly, this valve being then operable by turning the spindle operating head 26 to adjust the throttling of the outlet coolant flow from the assembly.

A collector bell 27 by which is meant a component having a skirt extending upstream of an axial stop and in this embodiment having a downwardly flaring mouth is constructed as part of the cage structure 11 and occupies a middle region of each of the channels formed thereby; the bell in this case is of annlar shape for the spindle 14 to pass therethrough but the spindle acts as a plug and through diametrically opposed slotted opening such as 28 places in communication with the bell a pocket 29 formed inside the spindle. Projecting into the pocket is a detector probe 30 adapted to detect the presence or absence of coolant in the pocket; in the present example this probe is a sheathed inductive element having suitably insulated leads 31 which, in the same manner as the leads, such as 32, of thermocouples 33, 34 and 35 extend through bores in the spindle to terminals in the casing 25. To form these bores, all but the end length of the spindle in the region of the pocket 29 is constituted by a core on the surface of which grooves are machined with a slight helical twist, this core being fitted in a sleeve so that the grooves become the bores.

Each channel of the cage structure 11 has vanes 36 to induce a vortex motion in the outlet coolant immediately upstream of the bell 27 and so encourage concentration of any entrained gas bubbles in a middle region of the channel where they will be taken into the bell. Gas collected in the bell displaces coolant in the pocket 29 (the structure of FIGURE 1C being entirely submerged in the coolant) and gradually the probe 30 is uncovered with consequent change of its electrical characteristics which will be indicated by an instrument (not shown) measuring the impedance thereof. Such indication is presumed to be caused by a failure of fuel element sheathing releasing gas liberated from the fuel in the assembly with which the particular instrumentation column is associated. There may of course be provision for the visual display of these indications on a control panel.

To enable an accumulation of gas to be cleared, the pocket 29 has a vent hole 37 with which cooperates a conical end of a rod 38 extending coaxially within the spindle 14. At its upper end this rod has a collar 39 sealed by a bellows 40 to the spindle 14 and also acting as a seat for a coil spring 41 which urges the rod downwardly so that the rod normally plugs the vent hole. A knob 42 accommodated in the operating head 26 enables the rod to be lifted against the action of the hold down spring 41 so that the vent hole can be unplugged for release of the accumulated gas through vents (not appearing in the drawings) in the spindle and ultimately find its way to a blanket gas space over the coolant in the reactor vessel. In some versions of this embodiment there is a steady bleed from the bell so that normal quantities of gas resulting say from degassing of the coolant, do not build up in the bell, whereas the quantity of gas normally arising from a failed sheath will result in the pocket 29 being filled, displacing coolant therefrom.

By way of modification, the rod 38 may have a fine axial bore extending over its entire length. The knob 42 would then be modified to enable a sample of gas from the pocket 29 to be drawn off for analysis.

In the embodiment of FIGURE 2, there is shown an upper fixture 50 which is joined by legs 51 to a casing or wrapper (not shown) of a vented fuel element assembly, there being supported in this wrapper a lattice of fuel elements of which the sheaths are connected in common to a vent tube 52. By means of the legs 51 there is space between the upper fixture and the wrapper for discharge of outlet coolant from the wrapper. The fixture is of annular shape to define a gas collector zone or chamber 53 into which the vent tube 52 penetrates, the lower end of the chamber having communication with exterior coolant through several holes 54 so that once the pressure of the gas content in the fuel element assembly becomes equal to that of such exterior coolant the chamber is virtually empty of coolant.

For the operation of a gag valve included in the fuel element assembly, a spindle 55 with a square end 56 extends into the upper fixture 50 and is depressible from the normal position, as illustrated, to engage the gag valve in the manner previously described for the first embodiment. Coiled around a thicker part of the spindle adjacent the upper half of the gas collector chamber 53 is a detector probe 57 similar to the probe 30 of the previous embodiment. This probe is adapted to be responsive to flooding of the chamber 53 with coolant, a circumstance which can occur as a result of a serious sheathing failure, because coolant can then enter the failed sheath and as a result of the difference of coolant pressure under normal flow conditions which will exist between the chamber holes 54 and the point of failure, will pass to the chamber 53 via the vent tube 52 and flood the chamber, displacing the gas therefrom. In the course of reactor operation, decreases of the fuel element temperature will cause coolant to be introduced into the chamber but if the extent of inflow is sufficient to cause a probe response, the spurious origin will of course be recognised.

Other types of liquid detector may be used: for example, in the first embodiment, the probe could be a body subject to sensible self-heating by incident radiations from the environment, such body being provided with means for monitoring its temperature. When in contact with coolant the rate of heat dissipation will be higher than when surrounded by gas and therefore a change of temperature will indicate the presence or absence of liquid. A thermocouple may be suitably constructed to act as a detector of this sort.

We claim:
1. Apparatus for testing for fuel element sheathing failures in a nuclear reactor in which the core of the nuclear reactor is immersed in a pool of liquid metal coolant and vertically disposed elongate fuel elements constituting the reactor core are cooled by a flow of the liquid metal coolant thereover, comprising collector means for localising within a collector zone any gaseous substance derived from the fuel elements, and detecting means in proximity to said collector zone for sensing whether said gaseous substance or coolant is mainly present in the collector zone, said collector means, collector zone and detecting means being disposed within the pool of liquid metal coolant and in association with a particular assembly of fuel elements, there being a said apparatus for each assembly of fuel elements in the reactor core.

2. Apparatus according to claim 1, wherein the detecting means includes a thermocouple for sensible self-heating by incident radiation.

3. Apparatus according to claim 1, wherein the detecting means includes an inductive probe.

References Cited
UNITED STATES PATENTS
3,060,722  10/1962  Migdal et al. _____ 73—19
3,234,101  2/1966  Berthod _____ 176—19

FOREIGN PATENTS
1,040,937  2/1963  Great Britain.

RICHARD C. QUEISSER, *Primary Examiner.*

C. I. McCLELLAND, *Assistant Examiner.*

U.S. Cl. X.R.

176—19